United States Patent [19]

Paulson

[11] 4,314,293
[45] Feb. 2, 1982

[54] SPIRAL DATA CARTRIDGE CAROUSEL AND POSITIONING MECHANISM

[75] Inventor: Gary R. Paulson, Meridian, Id.

[73] Assignee: Hewlett-Packard Company, Palo Alto, Calif.

[21] Appl. No.: 51,921

[22] Filed: Jun. 25, 1979

[51] Int. Cl.³ .................. G11B 22/04; G11B 15/66
[52] U.S. Cl. ............................................ 360/92; 360/85
[58] Field of Search ................. 360/92, 91, 132, 134, 360/69, 71, 85, 96.5; 414/34, 39, 55; 198/476, 778, 480; 424/194, 197–200, 180–181

[56] References Cited

U.S. PATENT DOCUMENTS

| | | |
|---|---|---|
| 3,524,949 | 8/1970 | Kleve .................................. 242/181 |
| 3,578,336 | 5/1971 | Ban ...................................... 360/92 |
| 3,599,986 | 8/1971 | Ban ...................................... 360/92 |
| 3,854,605 | 12/1974 | Proper et al. ........................ 360/92 |
| 3,953,890 | 4/1976 | Wanek et al. ....................... 360/92 |

*Primary Examiner*—Alfred H. Eddleman
*Attorney, Agent, or Firm*—Theodore Scott Park

[57] ABSTRACT

A cartridge housing for storing magnetic tape cartridges is described herein which provides cartridge storage compartments arranged in a spiral array within a carousel. The carousel is free to translate along an access orthogonal to the axis of rotation in response to rotation about its approximate center for selectively locating a desired cartridge at loading/unloading apparatus.

8 Claims, 6 Drawing Figures

SPIRAL DATA CARTRIDGE CAROUSEL AND POSITIONING MECHANISM

BACKGROUND OF THE INVENTION

Access mechanisms for magnetic tape cartridges, particularly those cartridges comprising relatively wide magnetic tape loaded on single spools used in helical scan read-write transports, include a housing (also referred to hereinafter as a "carousel") for transporting a plurality of such cartridges. Each cartridge is fetched from a location in the carousel by a fetching apparatus, loaded into a tape transport and read magnetically, then returned to the carousel.

Prior art carousels have been built in both circular and rectilinear configurations. In systems utilizing rectilinear array cartridge housings, the machanisms for locating the desired cartridge at the fetching apparatus require two degrees of freedom (X and Y) to retrieve the desired cartridge. However, such housings have the advantages of large capacity and compactness.

In other systems, cartridge housings are arranged in a circle for which the cartridge locating mechanism requires only one degree of freedom (rotation) for cartridge retrieval. While the mechanism for locating cartridges stored in a circular housing at the fetching apparatus is simple, the number of cartridges which can be conveniently stored in such housings is necessarily limited. Furthermore, as the number of cartridges to be housed increases, the radius, and hence the size, of the housing unit must increase disproportionately. See, for example, U.S. Pat. No. 3,953,890.

SUMMARY OF THE INVENTION

A cartridge housing constructed according to the preferred embodiment of the present invention provides cartridge storage compartments arranged in a spiral array within a carousel which is free to rotate about its approximate center. In one embodiment of the drive mechanism, the center bearings are mounted on a carriage which is free to slide along an axis orthogonal to the axis of rotation of the housing. A spiral shaped cam on the under side of the carousel couples rotation of the carousel to its translations for locating the desired cartridge at the fetching mechanism. The cam may be either a spiral groove or a rib along the spiral of cartridges in the carousel.

In another embodiment of the drive mechanism, a motor having capstan bearing against rib or a gear coupled to a rolled rack translates the spiral carousel as it rotates for locating the desired cartridge at the fetching mechansim. Similarly, in another embodiment, a differential chain drive apparatus similar to that described in U.S. Pat. No. 3,926,061 filed Dec. 16, 1975, entitled, "DIFFERENTIAL DRIVE ROTATING DISC IMPACT PRINTER" is used as the drive mechanism.

DESCRIPTION OF THE PREFERRED EMBODIMENT

Figure 1:
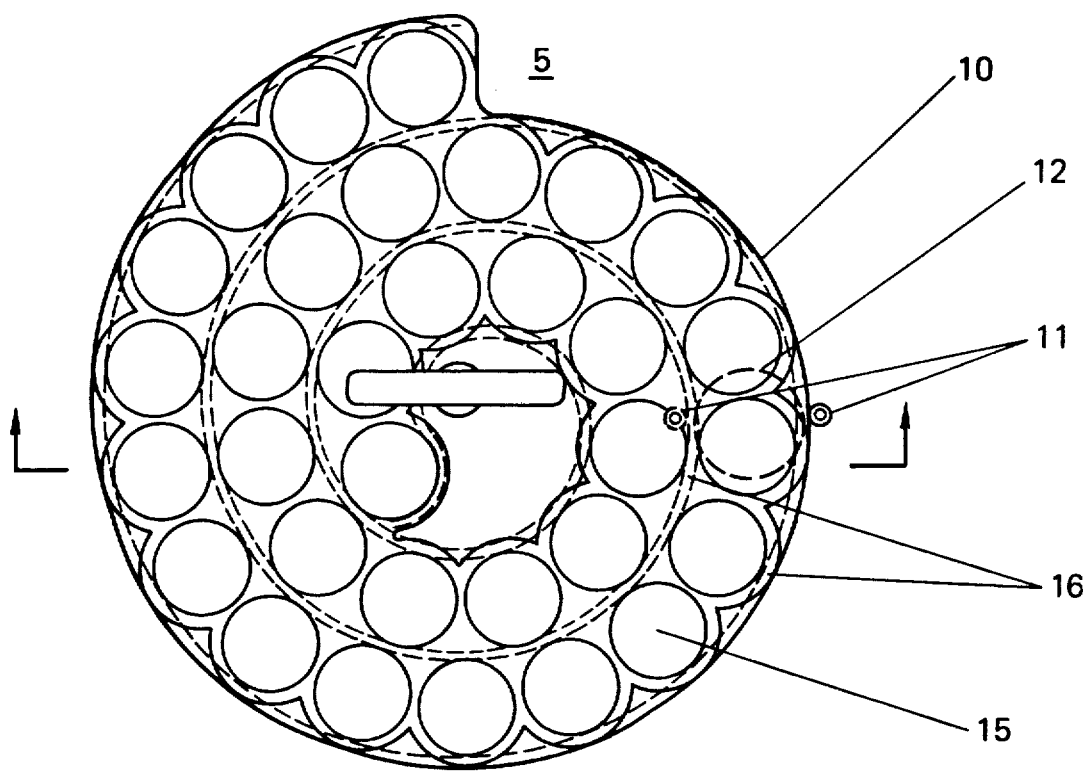
FIG. 1 is a top view of a cartridge housing constructed according to the preferred embodiment of the present invention.
Figure 2:
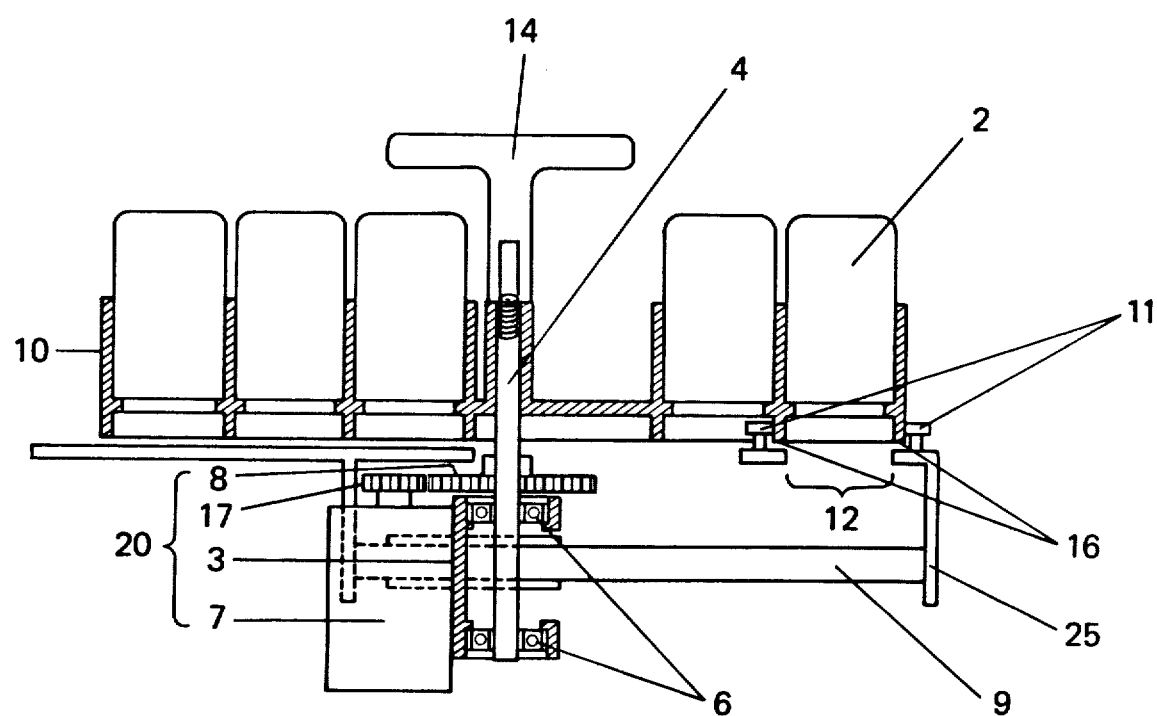
FIG. 2 is a side view of one embodiment of a drive mechanism constructed according to the present invention for driving the cartridge housing of FIG. 1.

Referring to FIGS. 1 and 2, carousel 5 may be constructed out of materials and in a manner similar to carousel 48 of U.S. Pat. No. 3,953,890. Carousel 5 of the present invention, however, comprises housing 10 having thirty-two (32) cavities 15, for storing and transporting magnetic tape cartridges 2 which are similar to cartridges 30 of the above-mentioned patent. Moreover, cavities 15, which are oriented with their axes parallel to the axis of rotation of the carousel, are arranged in a spiral about the approximate center of the carousel.

The spiral arrangement of cavities 15 provides a high cartridge packing density. Carousel 5 of FIG. 1 is approximately 14 inches in diameter which is substantially the same size as an ordinary removable disc pack used in present-day disc memory systems. If the cartridge cavities were arranged evenly about the perimeter as suggested by the above-mentioned patent, a 14-inch diameter carousel could accommodate only sixteen (16) such cartridges. Thus, twice as many cartridges may be housed in a carousel of the same diameter when constructed according to the present invention.

The number of cavities is primarily limited by the constraints on the carousel size imposed by the system including access time and the cartridge loading and unloading mechanism. In addition, as the number of cartridges stored in the carousel increases, the total weight of a fully loaded carousel may exceed reasonable limits for operator handling convenience.

In order to access information stored in the cartridges, the drive mechanism must be capable of randomly positioning each cavity at a loading and unloading (fetching) position such as unloading hole 12. Once located at hole 12, the desired cartridge is unloaded and reloaded by suitable apparatus such as that described in U.S. Pat. No. 3,953,890. Such apparatus are beyond the scope of this invention.

Since cavities 15 in carousel 5 are arranged in a spiral array, in order to selectively position the desired cartridge at hole 12, carousel 5 must both rotate and translate relative to hole 12.

Figure 3:
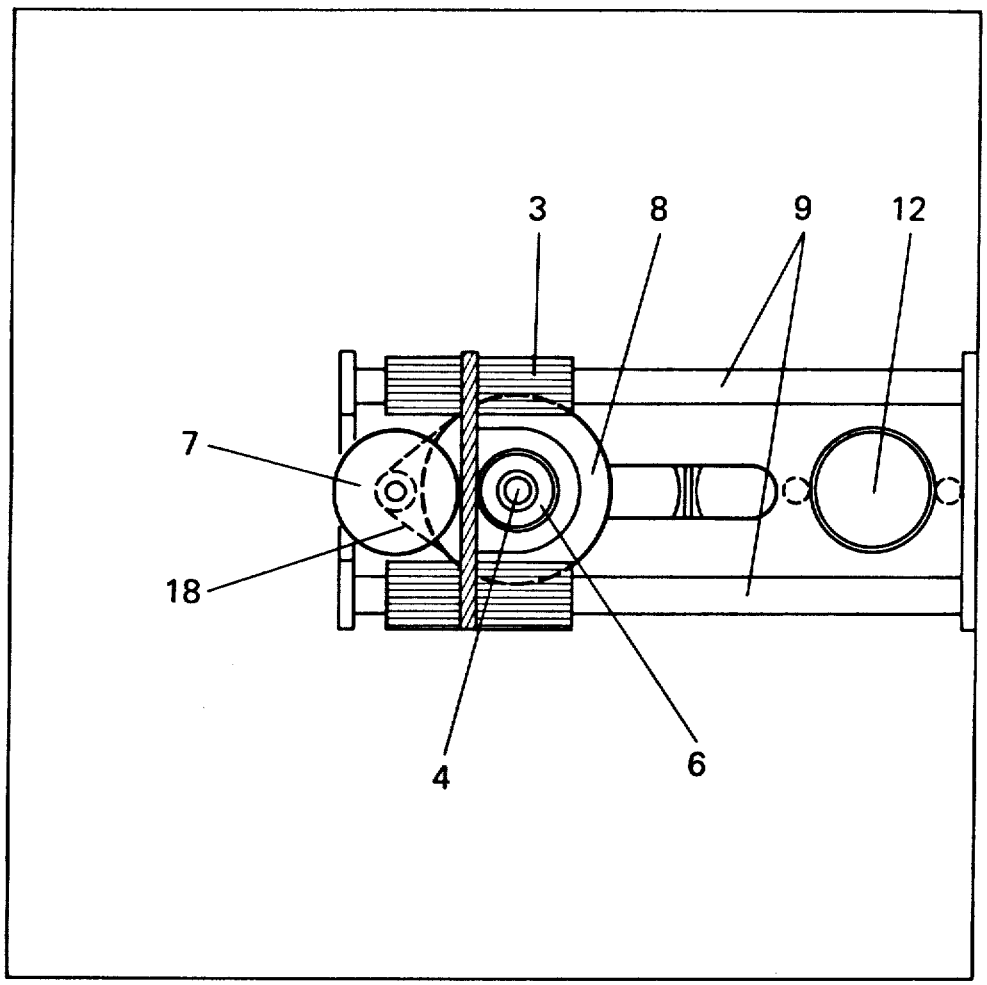
FIG. 3 is a bottom view of the drive mechanism of FIG. 2.

Referring now to FIGS. 2 and 3, housing 10 further includes spiral rib cam 16 which engages cam followers 11 fixedly mounted to chassis 25. Carousel drive mechanism 20, which imparts both rotational and translational movement to carousel 5, also includes motor 7 and sprocket 17 mounted to carriage 3. Sprocket 17 engages main pivot shaft sprocket 8 via drive belt 18 rotating main pivot shaft 4. Carousel 5 is attached to main pivot shaft 4 by carrying handle 14, which is threaded to receive the threaded end of shaft 4. The driven end of shaft 4 is retained in carriage 3 by bearings 6. Carriage 3 is slidably mounted on slide shafts 9. As shaft 4 is rotated, carriage 3 is free to translate along shafts 9 in response to the rib cam 16 on carousel 5 bearing against cam followers 11.

Referring again to FIG. 1, as carousel 5 is rotated clockwise, it also is translated to the right so that each cartridge cavity 15 passes directly over unloading hole 12. Conversely, when rotated center clockwise, carousel 5 is translated to the left. When the desired cartridge is in position, the drive mechanism is disabled and the cartridge is unloaded and information accessed as described above.

Figure 4:
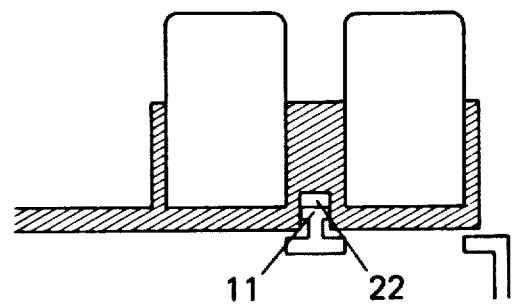
FIG. 4 is a side view of a portion of another embodiment of the drive mechanism of FIG. 2.

Referring to FIG. 4, spiral groove 22 may be substituted for rib cam 16, into which a single cam follower 11 fits. This configuration provides the advantage of a single cam surface controlling translation motion of the carousel.

Figure 5:
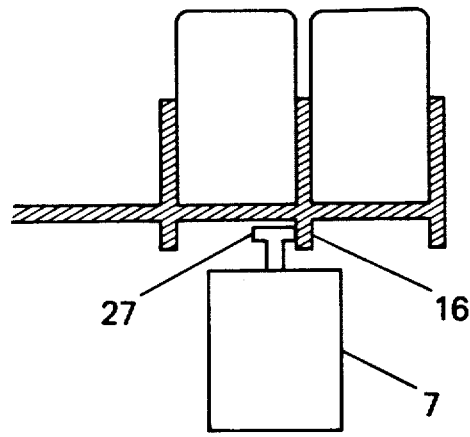
FIG. 5 is a side view of a portion of another embodiment of the drive mechanism of FIG. 2.

In FIG. 5, a simplified drive mechanism includes motor 7 fixedly mounted to chassis 25. Capstan 27, mounted to the drive shaft of motor 7 engages rib cam 16 for rotating and translating carousel 5 when motor 7 is running. In this configuration, cam followers 11 are eliminated and carousel 5 rotates about shaft 4 and translates on carriage 3.

Figure 6:
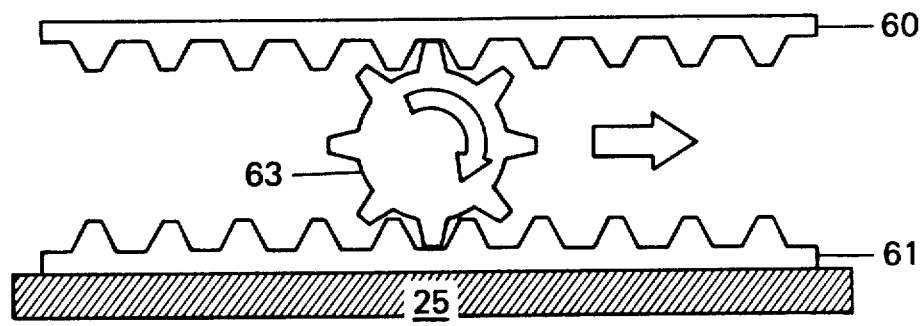
FIG. 6 is a side view of another embodiment of the drive mechanism of FIG. 2.

In another embodiment of a drive mechanism shown in FIG. 6, rack gears 60 and 61 engage pinion 63. Pinion 63 is coupled to carousel 5 (not shown) and rack gear 61 is fixedly mounted to a chassis 25. As rack 60 is driven, pinion 63 both rotates and translates along rack 61 in the ratios necessary to randomly and selectively position each cavity 15 at unloading hole 12. This and other embodiments of drive mechanisms adaptable to the present invention are described in U.S. Pat No. 3,926,061 which is incorporated by reference as if fully set forth herein.

I claim:

1. Apparatus for storing and transporting digital data comprising:
   a chassis;
   a carousel having a plurality of cavities arranged in a spiral array for storing and transporting a plurality of magnetic tape cartridges having data stored therein;
   mounting means for slidably and rotatably mounting the carousel to the chassis;
   fetching means fixedly mounted to the chassis for loading and unloading the cartridges from the carousel;
   drive means coupled to the mounting means for selectively positioning a desired cartridge at the fetching means in response to rotating the carousel about its approximate center.

2. Apparatus as in claim 1 wherein:
   the drive means includes rotation means for rotating the carousel and translation means for translating the carousel along a guide path orthogonal to the fetching means.

3. Apparatus as in claim 2 wherein the rotation means includes a rotatable sprocket and driver belt coupled to the carousel.

4. Apparatus as in claim 2 wherein the translation means includes a spiral rib cam and at least one cam follower coupled to the carousel.

5. Apparatus as in claim 2 wherein the rotation means includes a rotatablecapstan coupled to the carousel.

6. Apparatus as in claim 2 wherein the totation means incldues a pinion gear coupled to the carousel.

7. Apparatus as in claim 2 wherein the translation means includes a first rack coupled to the mounting means and a second rack fixedly coupled to the chassis.

8. Apparatus as in claim 2 wherein the translation means includes a spiral groove and a cam follower coupled to the carousel.

* * * * *